2,770,615

COPOLYMER OF TRIFLUOROCHLOROETHYLENE AND VINYLIDENE CHLORIDE AND A METHOD OF MANUFACTURING SAME

Charles O. Kroncke, Jr., Bayonne, N. J., assignor to The M. W. Kellogg Company, Jersey City, N. J., a corporation of Delaware No Drawing. Application August 4, 1951, Serial No. 240,453

5 Claims. (Cl. 260—87.7)

This invention relates to a copolymer containing halogen. In one aspect the invention relates to a copolymer of trifluorochloroethylene and a chlorinated ethylene. In a still more particular aspect the invention relates to a copolymer of trifluorochloroethylene and vinyl chloride, or vinylidene chloride, or mixtures thereof. In another aspect the invention relates to the manufacture of such copolymers.

Halogen-containing polymers and copolymers constitute a relatively new field of chemistry. These halogen-containing copolymers contain a relatively high proportion of halogens. In general such halogen-containing polymers or copolymers are relatively inert and have good physical and chemical stability. Because of these characteristics, the halogen-containing copolymers have many useful applications, such as for coating surfaces to render them corrosive resistant as insulators, and as molded articles of manufacture.

It is an object of this invention to provide a new copolymer having highly desirable physical and chemical characteristics.

Another object of this invention is to provide a method for manufacturing a new copolymer.

Various other objects and advantages of the present invention will become apparent to those skilled in the art from the accompanying description and disclosure.

The polymer of the present invention is a thermoplastic copolymer of trifluorochloroethylene and a chlorinated ethylene, such as vinyl chloride and vinylidene chloride, or mixtures thereof. A copolymer of the present invention contains between about 2 mol percent and about 50 mol percent trifluorochloroethylene and the remaining major constituent a chlorinated ethylene. In general these copolymers are prepared by copolymerizing trifluorochloroethylene with between about 20 mol percent and about 98 mol percent chlorinated ethylene at temperatures between about −20° C. and about 25° C. or 30° C. in the presence of a polymerization promoter. Although the chlorinated ethylene comonomer may be present in the reaction mixture in an amount as low as about 20 mol percent, the thermoplastic solid product obtained will contain a major proportion (mol basis) of the chlorinated ethylene.

In general relatively high yields are obtained when copolymerizing trifluorochloroethylene and the chlorinated ethylene. Employing less than 20 mol percent chlorinated ethylene the yield of polymer drops off sharply. Yields of solid product as high as 50 percent have been obtained and higher yields of up to 95 percent of the solid thermoplastic product may be achieved under appropriate conditions.

The presence of fluorine and the high halogen content of the copolymer renders the solid copolymer substantially inert and chemically stable. The thermoplastic copolymer of the present invention is substantially colorless and transparent when compressed in molded form. The solid copolymer is substantially chemically stable after prolonged exposure to acids and caustic solutions and other vigorous oxidizing materials. The plastic form of the copolymer is flexible and resilient and is substantially unaffected by water and high humidity. The plastic copolymer can be molded at conventional molding conditions at a temperature above about 300° C.

In general the copolymer has a melting point substantially above 200° C. and with the relatively high concentrations of trifluorochloroethylene the melting point is above 300° C. With some of the copolymer compositions of the present invention the usual melting point is not observed as it is so high that the copolymer begins to decompose before the melting point is reached.

In the preparation of the plastic copolymer of trifluorochloroethylene and a chlorinated ethylene, the monomers are mixed and maintained at a temperature between about −20° C. and about 30° C. for a period of time between about 30 minutes and about 12 days depending upon such factors as the particular temperature and promoter employed. The preferred temperature of polymerization is between about −17° C. and about 20° C. employing a suitable promoter.

In general organic peroxide promoters, such as the halogen substituted acetyl peroxides, are employed when the copolymer is prepared in the absence of a suspension agent. Trichloroacetyl peroxide is the preferred promoter in this instance. Various other halogen substituted organic peroxides, such as trifluoroacetyl peroxide, difluorochloroacetyl peroxide, 2,4-dichlorobenzoyl peroxide, chloroacetyl peroxide, trifluorodichloropropionyl peroxide and dichlorofluoroacetyl peroxide are also suitable for promoting the copolymerization.

The polymerization may be effected in the presence of a liquid suspension agent, such as water, or an organic liquid, such as hydrocarbon oils, or the liquefied monomers themselves, without departing from the scope of this invention. These suspension agents are diluents in which the monomers and copolymer are suspended during polymerization and serve to withdraw heat from the polymerization. In the case of water emulsion polymerization, the preferred promoters include the inorganic promoters, such as the persulfates, perborates, peroxides and perphosphates. Of these, potassium persulfate is preferred. The weight ratio of suspension agent or diluent to total monomer is between about 0.05 to about 10. Also, in employing the suspension type of polymerization relatively higher temperatures above the freezing point of the reaction mixture are employed, preferably temperatures between about 0° C. and about 30° C.

The concentration of promoter in the polymerization mixture varies over a considerable range but, generally, is within the range of between about 0.01 to about 5 weight percent based on total monomer in the reactor. The concentration will vary depending upon the ultimate molecular weight of the copolymer desired and upon the method of polymerization employed. For example, for the highest molecular weight product, the minimum amount of promoter is preferable. Also, in a continuous process in which the concentration of the promoter may be maintained relatively constant within narrow limits, the concentration of the promoter in the reaction zone will, therefore, correspond substantially at all times to the preferred composition for the particular product being produced. On the other hand in batch or bulk polymerization, excess promoter is employed initially, which concentration decreases by consumption during polymerization.

Various activators, and accelerators may be employed in conjunction with the promoter without departing from the scope of this invention. These activators are particularly useful in the suspension type of technique of polymerization when water is used as the suspension agent. Sodium bisulfite is an example of a suitable activator in aqueous emulsion polymerization. An example of a suitable accelerator is iron sulfate. The polymerization may also be effected in the presence of fillers or coloring agents, such as carbon black, titanium dioxide, asbestos, etc., without departing from the scope of this invention.

In bulk polymerization in which the polymerization is permitted to proceed until the monomers are converted to the desired plastic, the form of the product is a porous solid plug containing unreacted monomer in the interstices of the solid plug of copolymer. In the type of polymerization in which the copymer is permitted to form a slurry in a mass of liquid reaction medium, the copolymer is recovered as finely divided particles from the slurry by filtration or other conventional means. This is particularly the case in aqueous suspension polymerization, but is not confined to that type of polymerization since the monomers themselves in the liquid state may constitute the suspension agent.

After the copolymer has been recovered it is usually treated to remove unreacted monomer by vaporization and then the recovered copolymer, if not already in the form of finely divided particles, is broken up into smaller fragments for further handling.

The application of the copolymer to the surface is usually effected by applying a dispersion of the copolymer to the surface and in evaporating the dispersion medium followed by fusion or sintering of the particles of copolymer on the surface to form a continuous uniform film. In preparation of the dispersion, the copolymer must be ground to a relatively small size. This may be accomplished initially by grinding the fragments of solid plastic copolymer to a size less than about 40 mesh. After which pulverization, the copolymer and dispersing medium are admixed and the copolymer further ground in a ball mill, or like conventional means, to a particle size of from about 0.1 to about 10 microns. The concentration of the copolymer in the dispersion is usually between about 10 and about 30 percent.

Various dispersing mediums may be employed in dispersing the copolymer of this invention for application to surfaces. Such dispersing medium usually comprises a dispersing agent and a diluent. Suitable dispersing agents comprise the aliphatic and aromatic esters, the ether alcohols, and the ketones. Typical examples of the dispersing agents are: di-isobutyl ketone, methyl isobutyl ketone, cyclohexanone, methoxy ethanol, ethoxy ethanol, ethoxy ethoxy ethanol, methyl acetate, butyl acetate and ethyl benzoate.

Although the dispersion may be prepared without the use of a diluent; that is, with the dispersing agent alone, a diluent is preferred. Such diluents comprise the aromatic hydrocarbons, such as xylene, toluene, or benzene; hydrocarbon oil fractions containing relatively large amounts of aromatic hydrocarbons, aliphatic alcohols, unsubstituted ethers, such as dibutyl ether, and water. In using water as a diluent, it is preferred to employ acetone as a dispersing agent and butanol as a wetting agent.

Plasticizers may be incorporated with the dispersion. Such plasticizers are the fluorochlorocarbon oils and waxes. These plasticizers are incorporated with the mixture before or after ball milling during the preparation of the dispersion. The plasticizers are incorporated in the dispersing medium in similar amounts as the concentration of the plastic copolymer, the exact amount depending upon the amount of plasticization desired. The plasticizer may be incorporated during polymerization without departing from the scope of this invention.

Surfaces may be coated by dipping the surface of the article into the dispersion followed by fusion or sintering. A coating of not more than about two mils in thickness can be obtained by a single dip. Usually two or more dips with fusion between dips are required to obtain the desired thickness of uniform film upon the surface of the article. After each dip the surface containing the deposited plastic thereon is fused or sintered by heating to a temperature of at least 200° C., but usually not higher than about 250° C., for a period of time between 30 seconds and 25 minutes. When using a plasticizer, temperatures as low as 150° C. may be employed. The shorter periods of time within the above range are used with the higher temperatures of fusion. The lower temperatures of fusion are preferred since the tendency of the copolymer to decompose and attack metal surfaces is minimized. The procedure of dipping and fusing may be repeated until the desired film thickness is obtained. Other methods of application of films upon surfaces include spraying and painting. On rigid metal surfaces, it may be desirable to lower the temperature following fusion at a slow rate, giving better adhesion. On the other hand, when flexibility and toughness are required, a quick quench of the fused film, for example in water, will be necessary to obtain an essentially amorphous copolymer.

Another method of applying the plastic copolymer of this invention to surfaces includes dissolving the copolymer in a suitable solvent and evaporating the solvent after application of the solution to the surface to be coated. If insufficient thickness is obtained after one application of the solution, the procedure may be repeated until a sufficient film thickness is obtained.

The copolymer is soluble in a number of solvents. The preferred solvents are the fluorochlorocarbons, the ketones, esters and aromatic hydrocarbons.

The following examples are offered as a better understanding of the present invention and are not to be construed as unnecessarily limiting to the invention:

EXAMPLES

The following procedure is typical of that used for the copolymerization of trifluorochloroethylene with vinyl chloride or vinylidene chloride to produce a solid thermoplastic copolymer. A clean glass polymerization tube was evacuated and cooled with liquid nitrogen. 60 grams of vinyl chloride and 68 grams of trifluorochloroethylene were distilled into the cooled polymerization tube. On a mol basis this constituted about 64.4 mol percent vinyl chloride and 35.6 mol percent trifluorochloroethylene. The polymerization tube was then removed from the charging apparatus and 0.03 weight percent of trichloroacetyl peroxide was added to the polymerization mixture in the polymerization tube. The tube is then returned to the apparatus where is is cooled with liquid nitrogen, evacuated and sealed. The polymerization tube was kept at a temperature of −15° C. for seven days. A solid whitish product was recovered from the polymerization tube as a product of the process. This solid product constituted 34 grams representing a yield of about 27.9 percent. The no strength temperature of the solid product was 279° C.

Table I below shows various polymerizations of trifluorochloroethylene and vinyl chloride and the composition of the solid copolymer product:

Table I
COPOLYMERIZATION OF TRIFLUOROCHLOROETHYLENE AND VINYL CHLORIDE

| Mol percent $CClF=CF_2$ | Mol percent $CH_2=CHCl$ | Percent Yield | Percent $CH_2=CHCl$ in Copolymer |
|---|---|---|---|
| | | | Mol percent |
| 0 | 100 | 45 | |
| 2 | 98 | 50 | |
| 3 | 97 | 50 | |
| 7 | 93 | 30 | |
| 10 | 90 | 36 | 92 |
| 20 | 80 | 32 | |
| 30 | 70 | 27 | 83.5 |
| 40 | 60 | 25 | |
| 50 | 50 | 25 | 69.5 |
| 60 | 40 | 22 | |
| 70 | 30 | 18 | 66 |
| 80 | 20 | 10 | 51.5 |
| 90 | 10 | 5 | |
| 95 | 5 | 5 | |
| 97 | 3 | 4 | 30 |
| 99 | 1 | 4 | |

Table II below shows similar polymerizations and the composition of the product obtained by the copolymerization of trifluorochlorethylene and vinylidene chloride:

Table II

COPOLYMERIZATION OF TRIFLUOROCYLOROETHYLENE AND VINYLIDENE CHLORIDE

| Mol percent $CClF=CF_2$ | Mol percent $CH_2=CCl_2$ | Percent Yield | Percent $CH_2=CCl_2$ in Copolymer |
|---|---|---|---|
| | | | Mol Percent |
| 0 | 100 | 32.2 | |
| 76 | 24 | 28.9 | 93.5 |
| 64 | 36 | 20.4 | |
| 49 | 51 | 11.9 | 91.0 |
| 41 | 59 | 8.4 | |
| 25 | 75 | 2.5 | 90.6 |

For the best yields of solid copolymer product of trifluorochloroethylene and vinyl chloride, the mol percent of vinyl chloride in the polymerization mixture is maintained initially between about 50 and about 98 mol percent. For the best yields of the solid copolymer of trifluorochloroethylene and vinylidene chloride, the amount of vinylidene chloride in the polymerization mixture is maintained initially between about 20 and about 50 mol percent.

Having described my invention, I claim:

1. A method for preparing a copolymer of trifluorochloroethylene and vinylidene chloride which comprises polymerizing a reaction mixture comprising between 20 and not more than 98 mol percent of vinylidene chloride and between not less than 2 and 80 mol percent trifluorochloroethylene in the presence of an organic peroxide promoter at a temperature between about —20° C. and about 20° C.

2. A method for preparing a copolymer of trifluorochloroethylene and vinylidene chloride which comprises polymerizing a mixture containing between about 20 and about 50 mol percent vinylidene chloride and between about 50 and about 80 mol percent trifluorochloroethylene in the presence of a peroxy polymerization promoter at a temperature between about —17° C. and about 20° C.

3. A method for preparing a copolymer of trifluorochloroethylene and vinylidene chloride which comprises polymerizing a reaction mixture comprising between 20 and not more than 98 mol percent of vinylidene chloride and between not less than 2 and 80 mol percent of trifluorochloroethylene in the presence of a halogenated acyl peroxide at a temperature between about —20° C. and about 20° C. to produce a thermoplastic copolymer comprising more than two mol percent and less than 50 mol percent of trifluorochloroethylene and the remaining major constituent being vinylidene chloride.

4. A method for preparing a copolymer of trifluorochloroethylene and vinylidene chloride which comprises polymerizing a mixture containing between about 20 and about 50 mol percent of vinylidene chloride and between about 50 and about 80 mol percent of trifluorochloroethylene in the presence of a trichloroacetyl peroxide promoter at a temperature between about —17 and about 20° C. to produce a thermoplastic copolymer having a melting point above about 200° C. which comprises a minor proportion of trifluorochloroethylene and a major proportion of vinylidene chloride.

5. A thermoplastic copolymer having a melting point above about 200° C. which comprises between not less than 2 and 50 mol percent of trifluorochloroethylene and between not more than 98 and 50 mol percent vinylidene chloride as substantially the sole monomeric constituents.

References Cited in the file of this patent

UNITED STATES PATENTS

| 2,479,367 | Joyce | Aug. 16, 1949 |
| 2,497,046 | Kropa | Feb. 7, 1950 |
| 2,586,550 | Miller et al. | Feb. 19, 1952 |

FOREIGN PATENTS

| 677,071 | Germany | June 17, 1939 |

OTHER REFERENCES

Prober; Journal American Chem. Soc., February 1950, vol. 72, pages 1036, 1037.